J. W. INGLETON.
SAW SET.
APPLICATION FILED JULY 1, 1920.
1,392,644.
Patented Oct. 4, 1921.
2 SHEETS—SHEET 1.
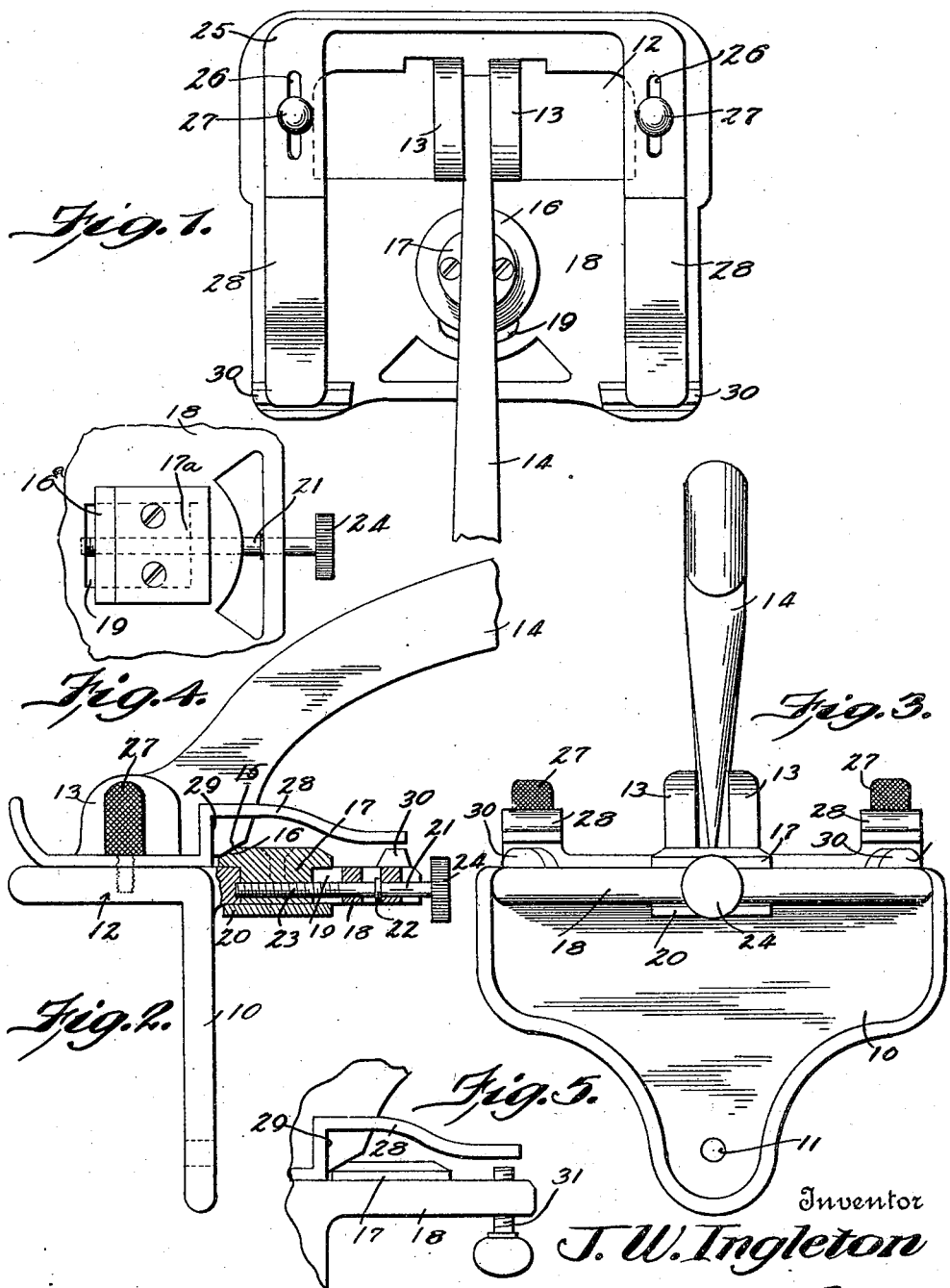
Inventor
J. W. Ingleton
Witness
By
Munn & Co.
Attorney

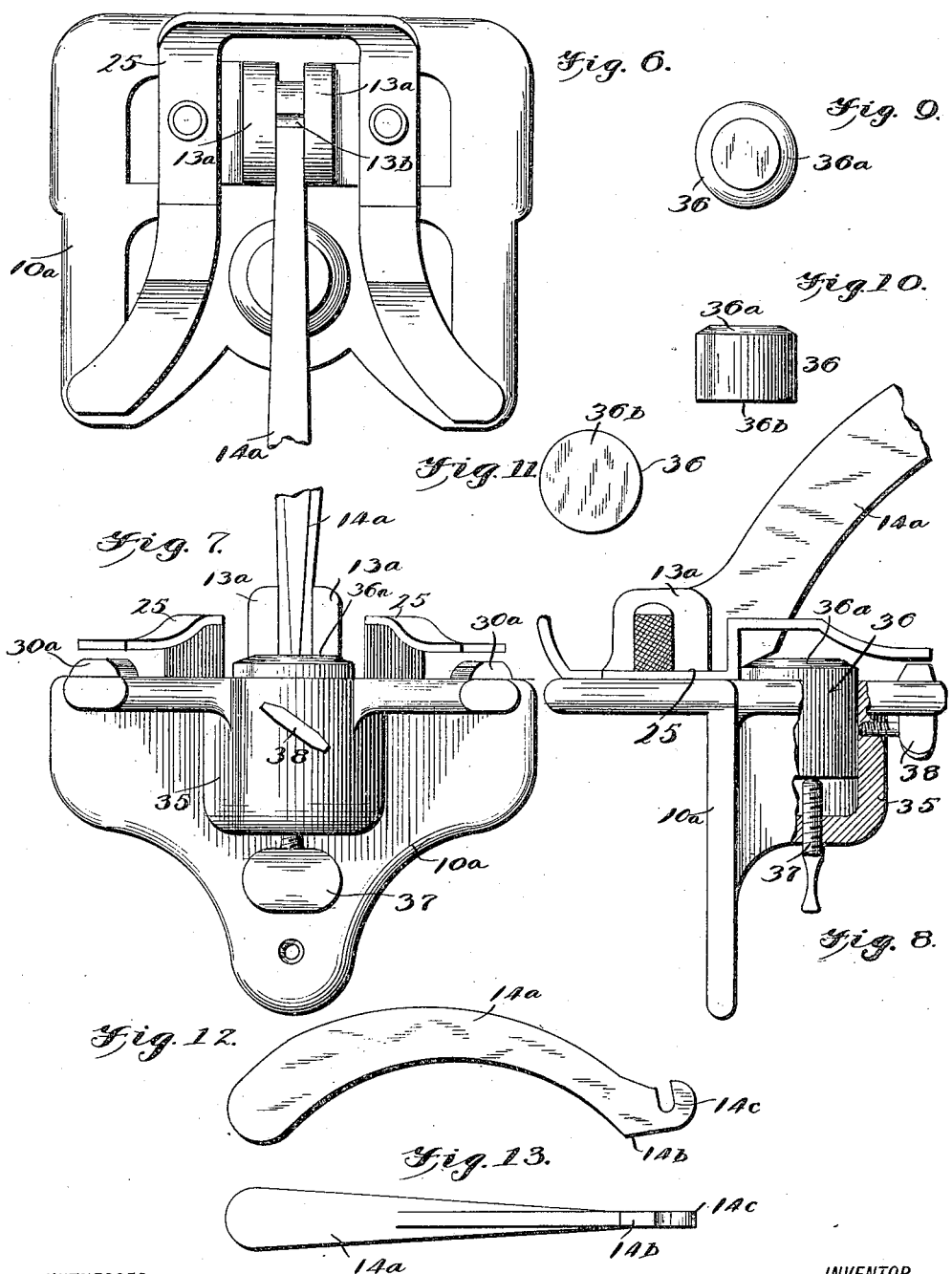

UNITED STATES PATENT OFFICE.

JAMES WILLIAM INGLETON, OF ASTORIA, OREGON.

SAW-SET.

1,392,644.  Specification of Letters Patent.  Patented Oct. 4, 1921.

Application filed July 1, 1920. Serial No. 393,296.

*To all whom it may concern:*

Be it known that I, JAMES W. INGLETON, a citizen of the United States, and a resident of Astoria, in the county of Clatsop and State of Oregon, have invented certain new and useful Improvements in Saw-Sets, of which the following is a specification.

My present invention relates generally to saw sets, and more particularly to a readily adjustable device of this nature which is of simple construction, may be conveniently utilized and will be durable and effective, and my object is the provision of an arrangement improved in these respects as will be seen from the following description referring to the accompanying drawing, in which—

Figure 1 is a top plan view of my improved device,

Fig. 2 is a sectional side view,

Fig. 3 is a front elevation.

Fig. 4 is a detail plan view of a fragmentary portion of the device,

Fig. 5 is a detail side view of a fragmentary portion of the device,

Figs. 6 and 7 are respectively a top plan view and a front elevation showing a slightly modified construction, Fig. 8 is a side view of the same partly broken away and in section, Figs. 9, 10 and 11 are respectively a top plan view, side elevation and bottom plan view of the die or anvil shown in the form of Figs. 6, 7 and 8, and Figs. 12 and 13 are respectively a side view and a bottom plan view of the lever.

Referring now to these figures and more particularly to Figs. 1 to 5 inclusive my invention proposes a saw set including a T-shaped frame of which the vertically disposed plate 10 may be apertured as at 11 for connection to the side of a support (not shown) upon which the rear portion 12 of the upper horizontal plate is adapted to rest. The rear portion of the upper horizontal plate 12 of the frame has upstanding laterally spaced ears 13 between which one end of a curved lever 14 is pivoted. This lever has upon its lower edge and adjacent to its pivoted end an angular flat saw tooth engaging surface 15 forming a setting jaw and adapted to be shifted toward and away from the angular face 16 of an anvil 17 adjustably mounted in connection with the forward portion 18 of the upper horizontal plate of the frame as particularly seen in Figs. 1 and 2.

For the receipt of the anvil 17 which as shown in Figs. 1 and 2 in particular may be of circular form with its saw tooth engaging edge 16 extending entirely therearound, the forward portion 18 of the upper frame plate has a slotted opening 19 parallel to the lever 14 and downwardly through which the shank of the anvil 17 extends and is connected to a lower slide plate 20 movably engaging the lower surface of plate 18. The shank of the anvil has a diametrical threaded opening and an adjusting screw 21 is journaled through portions of the plate 18 and held against lengthwise movement by a thrust collar 22, this adjusting screw having an inner threaded portion 23 which extends through the threaded opening of the anvil. The adjusting screw has an outer milled head 24 upon rotation of which the anvil is caused to shift inwardly and outwardly in the slot 18 depending upon the direction of such rotation.

If it is so desired the anvil may be rectangular as indicated at 17$^a$ in Fig. 4 with a transverse beveled saw tooth engaging edge 16$^a$ across its inner side, the other parts being the same as described in connection with Figs. 1 and 2.

According to either form an adjustable guard 25 of U-shape is disposed on the rear portion 12 of the upper body plate, with slots 26 in its side portions through which clamping screws 27 work into the plate 12 for securing the guard frame in adjusted position. The forwardly projecting extensions 28 of this guard frame are disposed along opposite sides of the forward portion 18 of the upper frame plate and have vertical offsets intermediate their ends forming shoulders 29 adapted to receive the toothed edge of a saw in abutting relation thereagainst, the saw blade resting upon the upper flat surface of the anvil 17 and upon saw bearing ribs 30 at the outer side portions of plate 18, opposing the outer free ends of the extensions 28 of the guard frame which thus coöperate with the ribs 30 to hold the saw blade steadily in my improved saw set when the blade is shifted horizontally between the same so as to move its toothed edge inwardly over the anvil and against the guard shoulders 29.

Thus with the blade in the position above described, the guard frame and the anvil are adjusted through the means previously described to proper positions which depends to some extent upon the length of the teeth of the saw being operated upon and the saw is then shifted to bring the proper teeth successively beneath the lever 14 the latter of which is forced downwardly against each tooth so alined as to press the tooth flatwise against the angular face of the anvil.

After proceeding in this manner the saw is reversed and again shifted longitudinally and the operation repeated in connection with the proper teeth.

It is obvious that my invention thus promotes simple effective operation which needs no particular skill and that the device is susceptible of various slight modifications and changes including the substitution of vertically adjustable screws 31 for the rigid saw bearing ribs 30 in order that the effective space between the upper ends of the bearing faces and the free ends of the guard frame extensions may be adjusted to the particular thickness of saw blade being operated upon.

It is also obvious from the foregoing that my invention is adaptable by virtue of the adjustments as described, to both cross cut and hand saws and may in fact be utilized with but slight change for saws of various types.

Referring to the form of the invention shown in Figs. 6 to 12 inclusive, it will be noted that the frame 10ª is generally of the form previously described but is in this instance provided with a forward upwardly opening tubular anvil holder 35 in which is a cylindrical anvil 36 slidably disposed and vertically adjustable beneath the lower saw engaging edge 14ᵇ of the lever 14ª, which latter has a slotted head 14ᶜ at one end removably engaging a pin 13ᵇ between upstanding ears 13ª of the frame. The anvil or die 36 has an upper annular beveled edge 36ª and its lower face 36ᵇ is flat and is engaged by the upper inner end of an adjusting thumb screw 37 threaded vertically through the base of the tubular holder 35 of the frame for adjusting the anvil, a second thumb screw 38 being threaded horizontally through the forward portion of the tubular holder between its upper and lower ends as seen in Figs. 7 and 8 in order to clamp the anvil and securely fasten the same in adjusted position. This form of the invention employs a U-shaped guard 25 similar to that of the first described form, the free ends of which coöperate with saw bearing ribs 30ª of the frame.

I claim:

1. A saw set comprising a frame including an upper horizontal plate, a lever pivoted upon the rear portion of the plate and having an angular flat surface upon its lower portion adjacent to its pivot, an anvil upon the forward portion of the plate and adjustable toward and away from the pivot of the lever and having an angular flat surface adapted to oppose the said surface of the lever, saw bearing members carried by the forward portion of the plate, and a guard frame adjustably mounted on the frame plate for movement parallel to the anvil and having side extensions provided with saw engaging shoulders at opposite sides of the lever as described.

2. A saw set comprising a frame including an upper horizontal plate, a lever pivoted upon the rear portion of the plate and having an angular flat surface upon its lower portion adjacent to its pivot, an anvil upon the forward portion of the plate adjustable toward and away from the pivot of the lever and having an angular flat surface adapted to oppose the said surface of the lever, saw bearing members carried by the forward portion of the plate, and a guard frame adjustably mounted on the frame plate for movement parallel to the anvil and having side extensions provided with saw engaging shoulders at opposite sides of the lever, the free ends of which extensions oppose the saw bearing members in spaced relation and coöperate therewith as described.

3. A saw set comprising a frame including a horizontally disposed plate, a lever pivoted at one end upon the plate and having a lower angular saw engaging surface adjacent to its pivot, an anvil on the plate forwardly of the lever pivot having an angular surface to coöperate with the angular surface of the lever, saw bearing members carried by the plate and coöperating with the anvil, and a guard frame on the plate having side extensions provided with vertical offsets intermediate their ends located upon relatively opposite sides of the lever.

4. A saw set comprising a frame including a horizontally disposed plate, a lever pivoted at one end upon the plate and having a lower angular saw engaging surface adjacent to its pivot, an anvil on the plate forwardly of the lever pivot having an angular surface to coöperate with the angular surface of the lever, saw bearing members carried by the plate and coöperating with the anvil, and a guard frame on the plate having side extensions provided with vertical offsets intermediate their ends located upon relatively opposite sides of the lever and also having free ends opposing the saw bearing members of the plate in spaced relation.

5. A saw set comprising a frame including a horizontally disposed plate, a lever pivoted at one end upon the plate and having a lower angular saw engaging surface adjacent to its pivot, an anvil on the plate forwardly of the lever pivot having an angular surface to coöperate with the angular surface of the lever, saw bearing members carried by the plate and coöperating with the anvil, and a guard frame on the plate having side extensions provided with vertical offsets intermediate their ends located upon relatively opposite sides of the lever, said anvil and said guard frame being adjustable in planes parallel to the plane of movement of the lever as described.

6. A saw set comprising a frame including a horizontally disposed plate, a lever pivoted at one end upon the plate and having a lower angular saw engaging surface adjacent to its pivot, an anvil on the plate forwardly of the lever pivot having an angular surface to coöperate with the angular surface of the lever, saw bearing members carried by the plate and coöperating with the anvil, and a guard frame on the plate having side extensions provided with vertical offsets intermediate their ends located upon relatively opposite sides of the lever, means mounted in connection with the frame plate for adjusting the anvil toward and away from the lever pivot, and adjustable connections for the guard frame permitting movement of the latter parallel to the movement of the anvil.

7. A saw set comprising a substantially T-shaped frame, a lever pivoted upon the upper rear portion of the frame and having a downwardly presented saw tooth engaging surface, an anvil adjustable in the upper forward portion of the frame and having a saw tooth receiving surface below the said engaging face of the lever, and a guard consisting of a U-shaped member secured on the upper portion of the frame and having forwardly projecting extensions at opposite sides of the anvil arranged to overlie and engage a saw blade resting on the anvil.

JAMES WILLIAM INGLETON.